(12) United States Patent
Venkataraman et al.

(10) Patent No.: US 11,599,295 B2
(45) Date of Patent: Mar. 7, 2023

(54) STORAGE ASSISTED VIRTUAL MACHINE BACKUPS USING STORAGE VMOTION AND XCOPY

(71) Applicant: EMC IP Holding Company LLC, Hopkinton, MA (US)

(72) Inventors: Srikanth Venkataraman, Bangalore (IN); Srinivas Kangyampeta, Bangalore (IN); Omkar Anand Ekbote, Pune (IN); Prakash Venkatanarayanan, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/384,042

(22) Filed: Jul. 23, 2021

(65) Prior Publication Data

US 2022/0382457 A1    Dec. 1, 2022

(30) Foreign Application Priority Data

May 27, 2021   (IN) .............................. 202111023668

(51) Int. Cl.
*G06F 12/00* (2006.01)
*G06F 3/06* (2006.01)
*G06F 13/16* (2006.01)
*G06F 13/42* (2006.01)
*G06F 9/455* (2018.01)

(52) U.S. Cl.
CPC .............. *G06F 3/065* (2013.01); *G06F 3/067* (2013.01); *G06F 3/0619* (2013.01); *G06F 3/0641* (2013.01); *G06F 3/0664* (2013.01); *G06F 9/45558* (2013.01); *G06F 13/1668* (2013.01); *G06F 13/4221* (2013.01); *G06F 2009/45583* (2013.01); *G06F 2213/0036* (2013.01)

(58) Field of Classification Search
CPC ....................................................... G06F 3/065
See application file for complete search history.

(56) References Cited

U.S. PATENT DOCUMENTS

| | | | |
|---|---|---|---|
| 2019/0129639 A1* | 5/2019 | Armangau | ............ G06F 16/137 |
| 2019/0391839 A1* | 12/2019 | Ryu | ..................... G06F 9/45558 |
| 2020/0159414 A1* | 5/2020 | Hu | ....................... G06F 16/9014 |

* cited by examiner

*Primary Examiner* — Daniel D Tsui
(74) *Attorney, Agent, or Firm* — Staniford Tomita LLP

(57) ABSTRACT

Embodiments for transferring data directly from primary storage to secondary storage in a virtualized network including virtual machine (VM) based storage, by exposing a source volume in the primary storage to a hypervisor host of the virtualized network, preparing a destination volume of the secondary storage as an empty volume and exporting it to the hypervisor host so that the host can the destination volume along with the source volume, and moving, in the hypervisor host, data from the exposed source volume to the exported empty destination volume using a combination of Storage Direct, Storage VMotion, and XCOPY or enhanced XCOPY technologies, wherein the XCOPY technology provides a direct transfer of data from the primary storage to the secondary storage.

20 Claims, 13 Drawing Sheets

300

Take Snapshot of Source Volume and Make it Visible to Hypervisor Host so Host can see Source Volume
302

Prepare Destination Volume as an Empty Volume and Export it to the Hypervisor Host so Host can see the Destination Volume
304

Hypervisor Host Moves Backup data from Source to Destination Using SV-Motion, StorageDirect, and XCOPY
306

STORAGE ASSISTED VIRTUAL MACHINE BACKUPS USING STORAGE VMOTION AND XCOPY

CROSS-REFERENCE TO RELATED APPLICATIONS

The present application is claims priority to Indian Patent Application No. 202111023668 filed on May 27, 2021, entitled "Storage Assisted Virtual Machine Backups Using Storage VMOTION and XCOPY," and assigned to the assignee of the present application, and is related to U.S. patent application Ser. No. 16/530,817, entitled "Method for Extending X-Copy Across Storage Systems," filed on Aug. 2, 2019, now issued as U.S. Pat. No. 11,199,986 on Dec. 14, 2021.

TECHNICAL FIELD

Embodiments are generally directed to large-scale backup systems, and more specifically to directly storing virtual machine data in secondary storage from primary storage.

BACKGROUND

Data protection comprising backup and recovery software products are crucial for enterprise-level network clients. Customers rely on backup systems to efficiently back up and recover data in the event of user error, data loss, system outages, hardware failure, or other catastrophic events to allow business applications to remain in service or quickly come back up to service after a failure condition or an outage. Secure and reliable backup processes form the basis for many information technology (IT) services.

Today there are several models of IT services offered as a service ("aS), such as IaaS (infrastructure as a service), PaaS (platform as a service), SaaS (software as a service), and so on. In all these cases, digital businesses are transitioning to Pay-Per-Use model in which compute, network, and storage resources are provided as services, which can be charged either together or as separate components. In such scenarios, customers want to count every available resource for production usage. In addition, backup solutions are required for customers to protect their data. Most of the present backup solutions consume compute and network resources of a production system to accomplish data movement during backup/restore operations. Such resource usage can represent a significant cost of the IT operations of the business.

One significant issue in present large scale virtualized systems that move data from a production environment as primary storage to a protection environment as protection storage is that data must be fed from the production storage to a hypervisor to virtual machines, such as through a Vproxy process, and then to secondary storage layer. This requires quite a few steps in the data transmission chain.

What is needed, therefore, is a backup solution that alleviates the resource constraints on the production host in virtual machine (e.g., VMware) environments. What is further needed is a system that can transfer data to be backed up directly from primary to secondary storage without going through the different virtualization layers that are currently used.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. DellEMC, NetWorker, Data Domain, Data Domain Restorer, and PowerProtect Data Manager (PPDM) are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
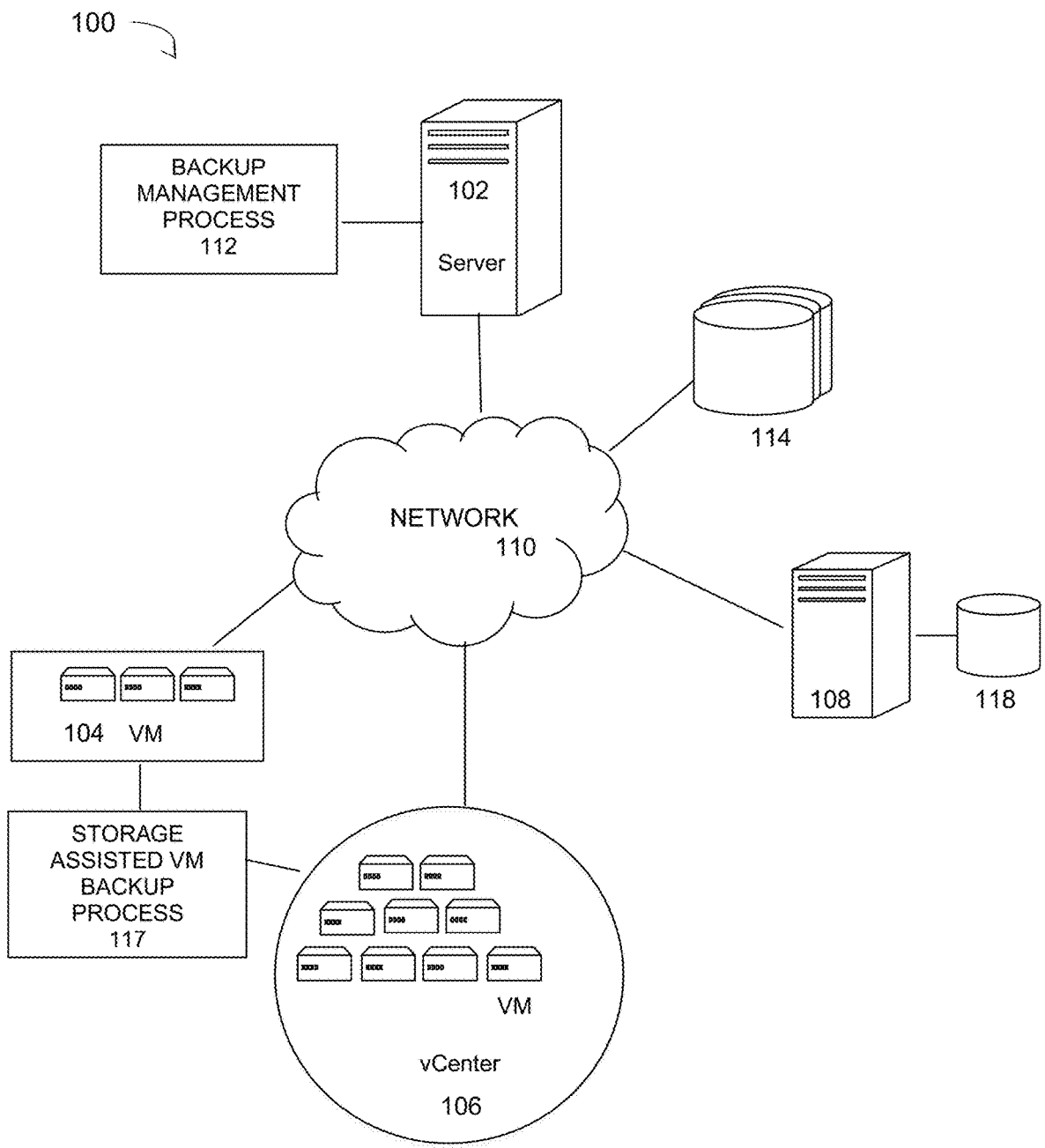
FIG. 1 is a diagram of a large-scale network implementing a storage assisted VM backup process, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the described embodiments encompass numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. The computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that embodiments may take, may be referred to as techniques. In general, the order of the steps of disclosed processes may be altered within the scope of the claimed embodiments.

Some embodiments involve backup techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments can be used in a physical storage environment, a virtual storage environment, or a mix of both, running a deduplicated backup program. In an embodiment, the overall system includes a number of virtual machines (VMs) or groups of VMs that are provided to serve as backup targets. Such target VMs may be organized into one or more vCenters (virtual centers) representing a physical or virtual network of many virtual machines (VMs), such as on the order of thousands of VMs each. The VMs serve as target storage devices for data backed up from one or more data sources, such as file system (FS) clients. Other data sources having data to be protected and backed up may include other VMs 104 and data in network storage.

FIG. 1 illustrates a computer network system 100 that implements one or more embodiments of a storage assisted VM backup process in a Hypervisor-based backup system. In system 100, a number of VMs or groups of VMs 104 are provided to serve as backup targets. Target VMs may also be organized into one or more vCenters (virtual centers) 106 representing a physical or virtual network of many virtual machines (VMs), such as on the order of thousands of VMs each. The VMs serve as target storage devices for data backed up from one or more data sources, such as computer 108, which may have attached local storage 118 or utilize networked accessed storage devices 114. The data sourced by the data source may be any appropriate data, such as database data that is part of a database management system. In this case, the data may reside on one or more hard drives (118 and/or 114) and may be stored in the database in a variety of formats. One example is an Extensible Markup Language (XML) database, which is a data persistence software system that allows data to be stored in XML format. Another example is a relational database management system (RDMS) which uses tables to store the information. Computer 108 may represent a database server that instantiates a program that interacts with the database. Each instance of a database server may, among other features, independently query the database and store information in the database, or it may be an application server that provides user interfaces to database servers, such as through web-based interface applications or through virtual database server or a virtual directory server applications.

A network server computer 102 is coupled directly or indirectly to the target VMs 104 and 106, and to the data source 108 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud-computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client storage, server storage (e.g., 118), or network storage (e.g., 114), which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, the data source storage is provided through VM or physical storage devices, and the target storage devices represent disk-based targets implemented through virtual machine technology.

For the embodiment of FIG. 1, network system 100 includes a server 102 that executes a backup management process 112 automates the backup of network data using the target VM devices. In an embodiment, the process 112 uses certain known full and incremental (or differencing) backup techniques along with a snapshot backup process that is used to store an image or images of the system(s) to be backed up prior to the full or incremental backup operations. In an embodiment, system 100 may represent a Data Domain in Restorer (DDR)-based deduplication storage system, and storage server 128 may be implemented as a DDR Deduplication Storage server provided by EMC Corporation. However, other similar backup and storage systems are also possible.

In an embodiment, certain virtualization technologies are used to implement virtual machine (VM) based backup and restore operations. Such systems utilize a hypervisor, which is a computer component (software/firmware/hardware) that creates and runs virtual machines. A computer on which a hypervisor runs one or more virtual machines is called a host machine, and each virtual machine is called a guest machine. The hypervisor presents the guest operating systems with a virtual operating platform and manages the execution of the guest operating systems. Multiple instances of a variety of operating systems may share the virtualized hardware resources. Embodiments are described with respect to VMware-based VM systems, though other similar VM environments and hypervisors may also be used.

As shown in FIG. 1, system 100 includes a storage assisted VM backup process 117 that moves virtual disk data between production storage and protection storage for backup and restore operations without consuming hypervisor host resources, by utilizing certain processes that exposes the protection target as a regular VM file system target (e.g., using Storage Direct) offloads data copy operations to storage systems and away from the hypervisor (e.g., using Storage VMotion) even in cases where the storage and destination are in different storage systems (e.g., using Enhanced XCOPY). The XCOPY technology provides a direct transfer of data from the primary storage to the secondary storage within the same storage array (for XCOPY) or between different storage arrays (for enhanced XCOPY). Process 117 basically functions to take a system in which the data copy happens through the host/VM/hypervisor to one in which the XCOPY technology is used to make a direct copy from source to destination.

Figure 2:
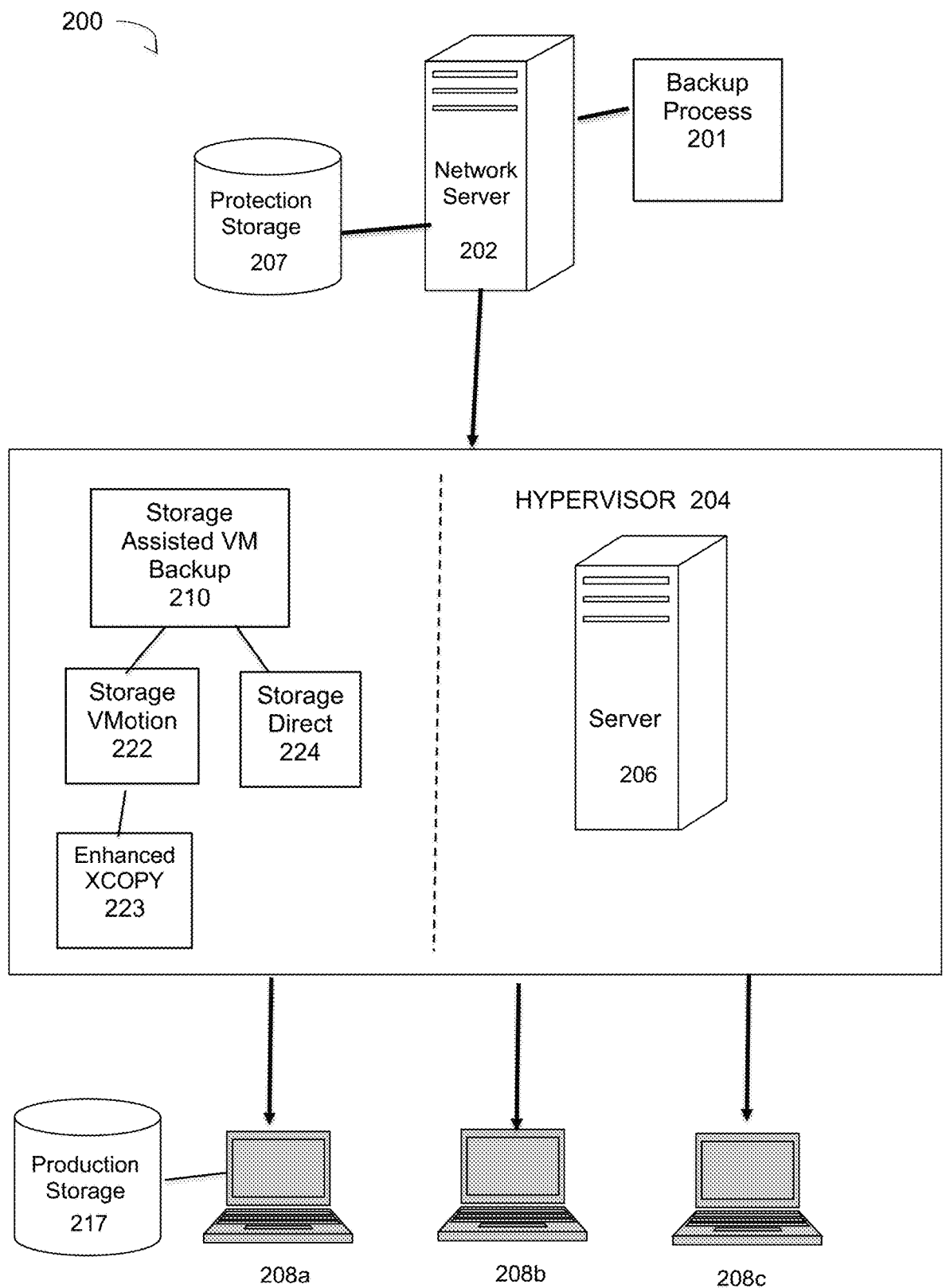
FIG. 2 illustrates the storage assisted VM backup process as a component in a hypervisor-based environment, under some embodiments.

FIG. 2 illustrates a storage assisted VM backup process in the context of a hypervisor-based VM environment, under some embodiments. As shown in system 200 of FIG. 2, a network server 202 runs certain resources and access to network storage media 207, which may represent protection or 'secondary' storage to stored data backed up by network clients (data sources) 208*a-c* through backup program 201. The hypervisor layer 204 is supported by server 206 and one or more applications that may be run as a plug-in on each client computer 208*a-c*.

In an embodiment, system 200 implements the data backup system 100 of FIG. 1 in which the storage server 102 includes interfaces to other VM-based backup targets to store data backed up from a data source or other clients. The backed-up data may include a volume, portion of a volume, applications, services, user-generated or user data, logs, files, directories, databases, operating system information, configuration files, machine data, system data, and so forth. For system 200, the VMs include volumes that store information that needs to be backed up through a backup operation executed by the backup agent on each client 208*a-c*. Volumes may be associated with a database or repository or other data source, and the backup process backs up each virtual machine, which are represented as virtual disks. The file system may be configured to store any and all back up information related to the virtual disk files, and the files containing the VM data may be created based on a virtual disk format and may contain information typically contained in a physical volume. The clients 208*a-c* may access storage media 217 that serves as production or 'primary' storage for these data sources.

In a typical VM system, the data movement for backup and restore operations for VMFS-based (VM file system) VMs consume extensive production host resources. Unlike, the methods used to offload physical server-based VM backups, the VMFS-based VM backups cannot be offloaded to storage system assisted backup since the Virtual Disk to Storage Logical Unit (LUN) mapping lies in the VMFS layer in the hypervisor (e.g., ESXi) server. This information is critical to perform VM level backups in a VMFS-based VM environment.

The storage assisted VM backup process 210 of FIG. 2 helps transfer data directly from production storage 217 to protection storage 207 without going through the hypervisor-Vproxy-VM transmission chain as currently required.

Embodiments use a storage direct solution (e.g., Storage Direct from Dell Technologies) to helps users to offload the data movement of backup/restore operations to storage systems, thereby saving production host costs. The storage direct solution enables direct data movement from primary storage system to backup (protection) target storage, without overloading the production host resources. This solution applies for VMware environments also, where there are VVOL (virtual volume) based VMs, as well as other similar virtualized environments.

In general, however, for VMs that are VMFS based, backups typically cannot presently be offloaded to storage system using such storage direct techniques. This is because the mapping information of the Virtual Disks of VMs to storage Logical Units (LUNs) is available only in the VMFS layer (e.g., inside ESXi) and hence no such offload is possible. Thus, all present industry solutions today are forced to use the production host(s) for their backup/restore operations for their VMFS based VMs.

Embodiments overcome this problem by combining the storage direct feature and a storage VMotion to effectively offload the data movement between storage system and backup destination. Thus, as shown in FIG. 2, the storage assisted VM backup process 210 utilizes both a storage direct processing component 224 and a storage VMotion processing component 222.

In an example VMWare VMFS environment, a Virtual Machine comprises virtual disks and configuration files. These virtual disks are files created in a file system which is hosted by Hypervisor layer (e.g., ESXi) called vSphere Virtual Machine File System (VMFS). To store Virtual Disks, the ESXi hypervisor uses datastores. The datastores are logical containers that hide specifics of physical storage from virtual machines and provide a uniform model for storing the virtual machine files. The datastores that are deployed on block storage devices use the native vSphere Virtual Machine File System (VMFS) format. At present, backup and restore of Virtual Machines is accomplished using vSphere VMware APIs for Data Protection (VADP).

In this model, a virtual appliance (VM) is installed in the respective VMware environment, which accomplishes data movement for backup and restore operations through VADP. It transfers the Virtual Disk data through one of the transport modes announced by a Virtual Disk Development Kit (VDDK), such as Hotadd, NBD, etc. The data movers in this model must read the data into a virtual appliance using one of VDDK transport modes, and write data to protection targets, like Data Domain storage devices.

Although embodiments are described with respect to a VMware-based environment using the ESXi hypervisor, it should be noted that embodiments are not so limited and any other hypervisor and VM components can be used in any other similar virtualized system.

The challenges with the VADP model (or similar backup/restore process for VMs) with respect to data move operations can include the fact that the virtual disk data must be read from the production storage and written into backup (protection) storage during a backup operation, and for restores, the data is read from backup target to production storage. Second, such read/write operations consume the host/hypervisor resources, such as CPU, memory, network bandwidth, which are presently shared with production application environment. This model is thus not very efficient since backup and restores involve reads from production storage into the host memory and then a write to a protection target, which is a two-step process. Some existing solutions attempt to overcome this problem, such as by mounting the storage snapshot in the hypervisor and the snapshot of the virtual disk is moved through virtual appliance. However, even with this approach, the production host is heavily involved in the entire process and so other applications running on the production host can suffer performance issues.

Embodiments of the data movement solution 210 leverages certain technologies such as Storage VMotion (SV-Motion) 222 from VMware, which offers seamless migration across storage systems, without imposing any downtime or requiring application reconfiguration. This operation primarily relies on a storage system-based data copy offload mechanism with an XCOPY or similar mechanism. XCOPY is a standard SCSI (small computer system interface) command where the copy operation is offloaded to the array software. XCOPY is a primitive that allows one storage device provides an offset and range to another, and has that device perform the data transfer, however, XCOPY in present systems only works if both the source and destination are in the same storage array.

Thus, present systems perform the XCOPY offload only when both the source and destination volume the within the same array or same storage system. In cases where XCOPY is not offered by the storage system, the SV-Motion process 222 uses the production host to achieve the data movement. Embodiments use a variant of XCOPY (referred to as Enhanced XCOPY) 223 in one embodiment to get the data copy offloaded from host to storage system. Enhanced XCOPY is an improvement of the existing XCOPY schema in which the data copy is offloaded to the storage system even when the source and destination are across two different storage systems. This extension (or enhancement) allows SV-Motion to offload data-copy, across primary storage and protection target (backup unit).

The Enhanced XCOPY process 223 was developed to address the challenge of migrating user data from one storage type or platform to a second storage type or platform. This process can be used by the host software to offload a copy operation, wherein the source and destination volumes can be in separate storage systems. The arrays will make use of certain replication technology to achieve this copy operation. Making use of an array's existing replication relationship helps alleviate the security related aspects of this copy operation.

The process flow of the Enhanced XCOPY process 223 begins with the storage V-Motion process 222 determining if the source and destination belong to the same storage array (or storage array cluster). If they are different, the hypervisor (ESXi) will issue the existing command (e.g., esxcli core storage <dev>) on the destination device to see, if the array supports this new Enhanced XCOPY command. This command can be also sent on source device and same results can be expected, if the array supports the same.

The destination volume, which is receiving the command should not already be in remote replication relationship. This is because such volumes are typically not exposed to the host, and even if exposed, they are in read-only mode. So, the volume should be in no prior remote replication relationship while the arrays itself could be in this remote partnership already.

If the array supports this feature, the host can do some additional validation. This validation step is proposed as an optional step and not mandatory. This is not mandatory, since the array will do the validation anyway and the host can avoid additional changes in the current flow by offloading such checks also. Should the host decide to some validation, the host can query the array to return the array identifiers of all remote arrays, to which there exists a remote replication partnership. This can be then checked with both source and destination volume's array identifiers. Only if there is a match does it proceed to make use of this new feature. If not, it can directly proceed with host-based reads and writes. Should the returned array identifiers match with what the host is getting from the source and destination volumes, the host will issue the Enhanced XCOPY command to the destination. If the host decides to skip the validation, it can directly send the XCOPY command to the destination.

Upon receiving the XCOPY command, the destination array will do any required operations, such as sanity checking. This will include checking if the given source identifier (WWN format) is already in a remote replication relationship. The array can fail this command for several other reasons also, which includes the current network connectivity status and the host software is expected to fall back to host-based reads and writes. The host software will issue the copy results [SCSI RECEIVE COPY RESULTS] to get the command completion. If there is a failure, the host software falls back to host-based reads and writes. The end user of Storage V-Motion is not affected even if the array does not support or is not able to complete the copy offload request.

Using enhanced XCOPY 223, the scale and performance of Storage V-Motion 222 is significantly increased since the copy is done by the arrays. This will be a direct copy and so performance will be much better than otherwise. Other advantages include the fact that the host copy is not affected by this operation, the solution is vendor neutral and can be extended to other host platforms like Microsoft, and it can solve some challenges in the current spoofing-based migration solutions, such as going across SCSI to NVMe.

As shown in FIG. 2, the second main component of the storage assisted VM backup process 210 is the storage direct feature 224 that allows direct data movement from storage system to backup (protection) target. In an embodiment, a 'direct access' process is used wherein a host can directly access the backed-up volume, even without doing a restore operation. This direct access provides the host with read (or read/write) access to the backed-up volume, which is residing in the backup target like Data domain. Embodiments leverage the direct access feature of storage direct, to enable a direct access of backup target volume from host. It should be noted that the terms 'storage direct' and 'DD boost' in the context of a DataDomain system are used interchangeably herein to refer to the same feature, as a client-side processing agent that offloads certain host processing.

Figure 3:
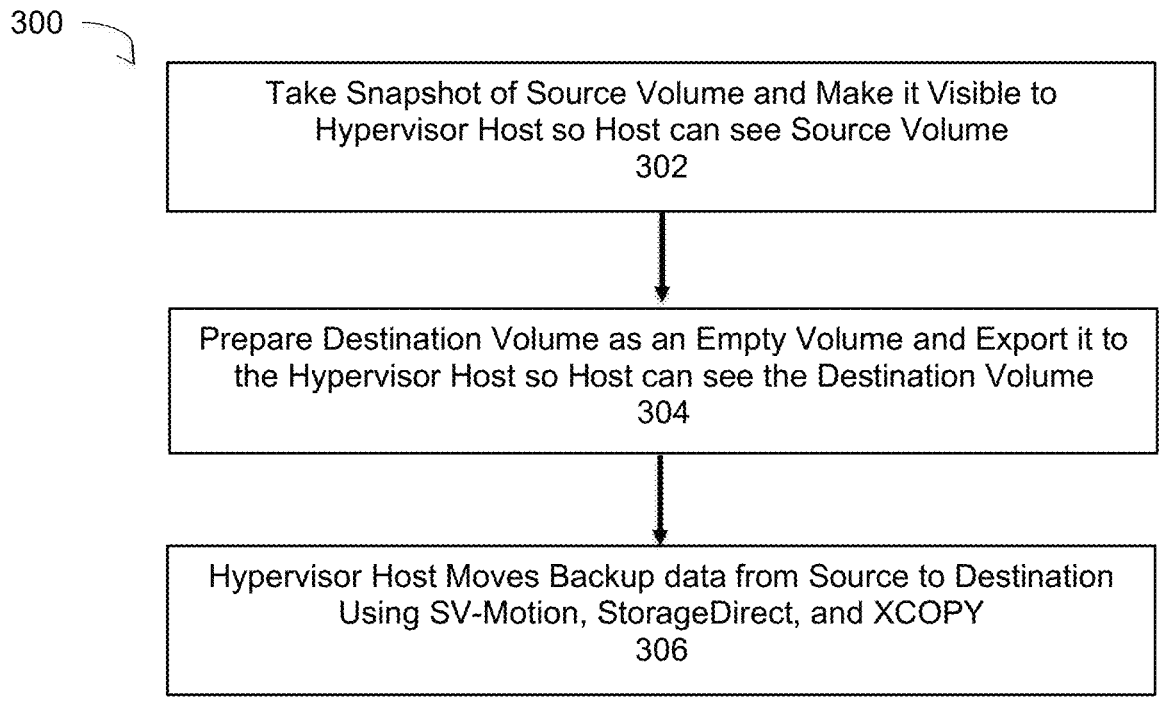
FIG. 3 is a flowchart illustrating an overall process of performing storage assisted VM backups, under some embodiments.

FIG. 3 is a flowchart 300 illustrating an overall process of performing storage assisted VM backups, under some embodiments. The storage assisted VM backup process essentially exposes the source (production) volume and makes it visible to the hypervisor host (from within the source or destination) so that the host can see the source volume 302. It also prepares the destination (protection) volume and exports it to the hypervisor host as an empty or 'shell' volume so that the host can the destination volume, 304. The host then effectively moves the backup data from the source to the destination using a combination of Storage Vmotion, Storage Direct (DDboost) and XCOPY or enhanced XCOPY technologies, 306. The act of 'exposing' essentially involves exporting a volume in storage to the hypervisor host, and in this process, volumes are exposed so that the hypervisor host can see both the source and destination volumes.

Figure 4:
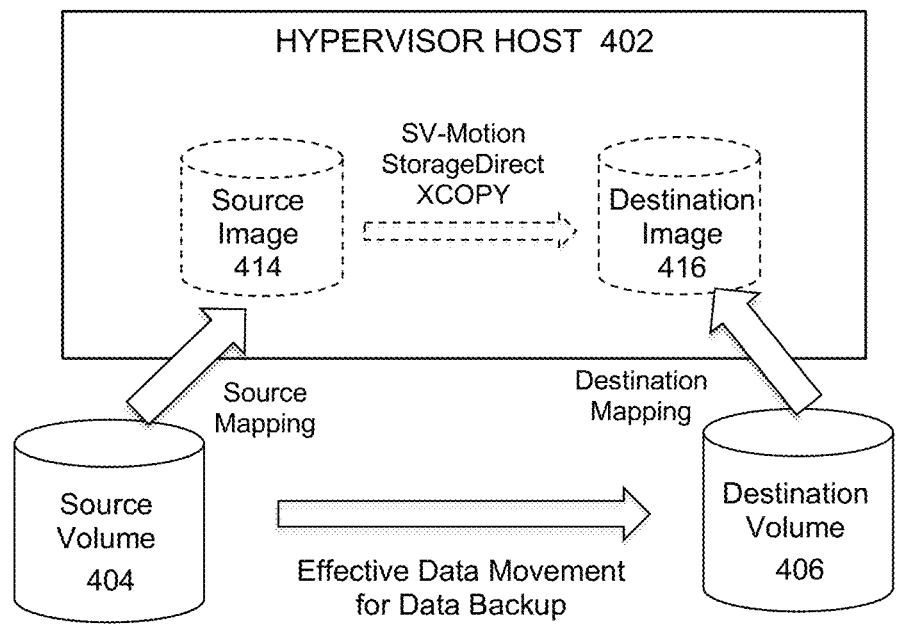
FIG. 4 illustrates the interaction among the hypervisor host and source/destination volumes for the storage assisted backup process of FIG. 3, under some embodiments.

FIG. 4 illustrates the interaction among the hypervisor host and source/destination volumes for the storage assisted backup process of FIG. 3, under some embodiments. As shown in diagram 400 of FIG. 4, the source volume 404 is mapped or made visible to the hypervisor host 404 to create a source image 414 in the hypervisor layer. Likewise, the destination volume 406, as an empty volume is mapped to the hypervisor layer 404 to create a destination image 416. Data from the source volume is transferred using the source image 414 to the created destination image 416 using the SV-Motion, Storage Direct and XCOPY/enhanced XCOPY technologies so that data is effectively moved directly from the source volume 404 to the destination volume 406 for the backup operation.

The method and system of FIGS. 3 and 4 help overcome the issue that is created for data stores created on top of a VMFS layer, and which are then exported to VMs. The VMDKs attached to VMs are files in the datastores. The mapping between the disks and the files lies in the VMFS layer and is needed to enable the storage layer to move data (VMDK files) for the VMs. As shown in these figures, certain technology is used to move the data within the hypervisor host. VMotion is a VMware technology that moves a VM from one host to another host without any downtime because the compute resource is actually moved. Storage VMotion modifies this technology so that the compute does not move, but the underlying storage moves from a first storage box to a second storage box. The XCOPY technology allows the first storage to simply specify a start address and range, and then offloads the copy operation to the second storage; and Extended XCOPY allows this movement across disparate storage systems. The Storage Direct/DDBoost technology takes the snapshot of the data. Different granularity details move to second storage within that granularity.

Figure 5:
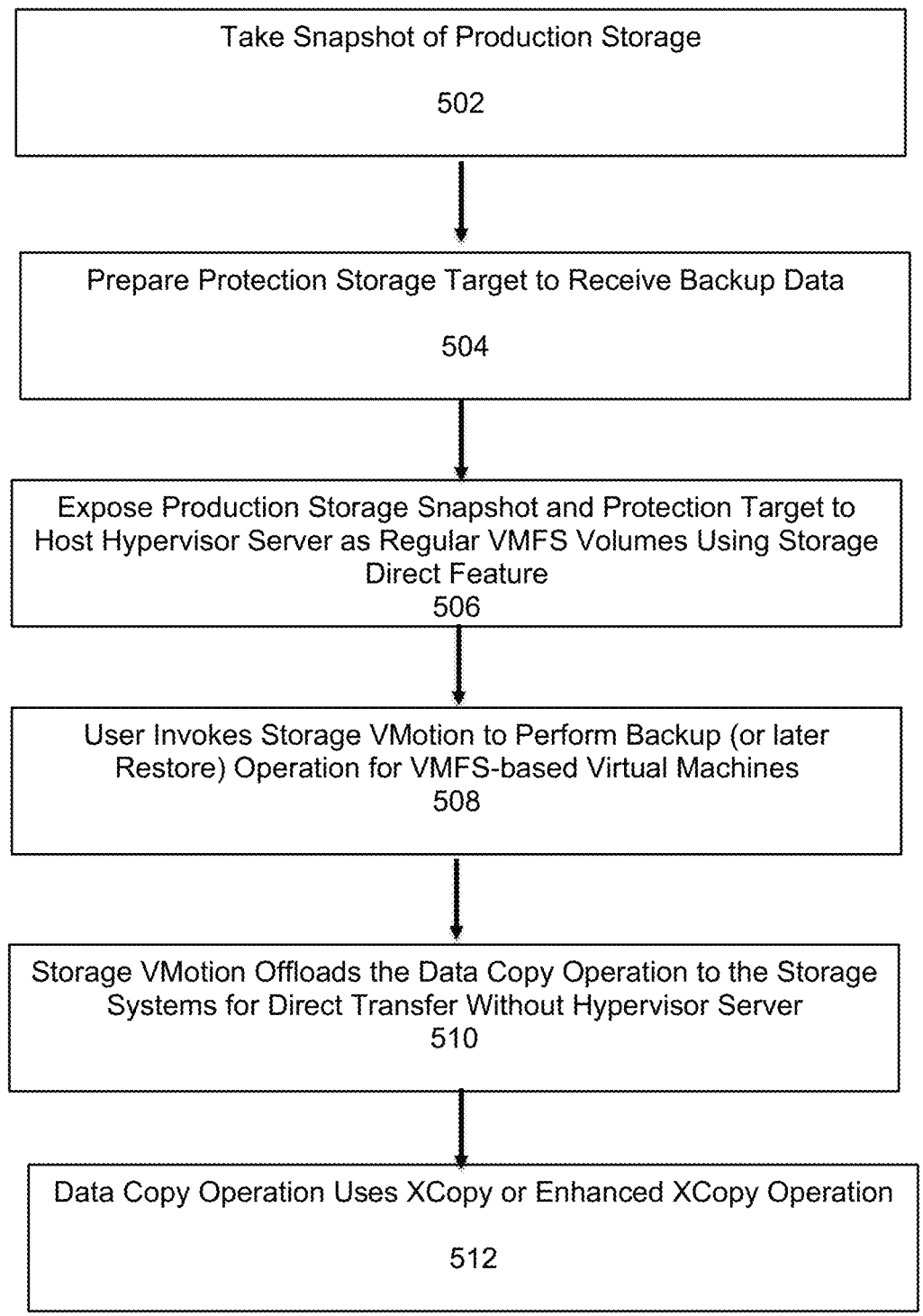
FIG. 5 is a more detailed flowchart that illustrates an overall process of a storage assisted VM backup process in the context of a system having a production volume and protection storage, under some embodiments.

FIG. 5 is a slightly more detailed flowchart that illustrates an overall process 300 of a storage assisted VM backup process in the context of a system having a production volume and protection storage, under some embodiments. Process 500 begins with a snapshot of the production volume taken in the production storage 217 using backup program 201 mechanisms. The backup (protection) storage target 207 (e.g., Data Domain appliance) is made ready to receive the backup contents, 504. The production storage snapshot (from 502) and protection target (from 504) are exposed to the hypervisor host (e.g., ESXi server) 204 as if they are two regular VMFS volumes, 506. The snapshot volume is exposed via the production storage 207, and the backup target can be exposed to the host via the production storage 217 or via the storage target (DD appliance). Exposing the protection target as a regular VMFS volume to the host (either via Data Domain or via the production storage) utilizes the Storage Direct process 224 and is a key enabling feature.

Once the hypervisor host 204 has access to both the source snapshot and the destination backup target, the user can invoke the Storage VMotion process to perform the backup (and later restore) operation for the VMFS based VMs, 508. The Storage VMotion process offloads the data copy operation to the storage systems to enable direct transfer of data without involving the hypervisor host 204, step 510. The data copy operation involved in the Storage VMotion is offloaded between storage systems and protection target, using XCOPY or enhanced XCOPY operation, 512.

In this manner, data is transferred directly from the production storage 217 to the protection storage 217 without going through the hypervisor and Vproxy layers. That is, VMs can be directly moved from primary to secondary storage through the use of SV-Motion that helps the VM read the primary (production) storage and enhanced XCOPY to copy that data directly to secondary (protection) storage.

Figure 6:
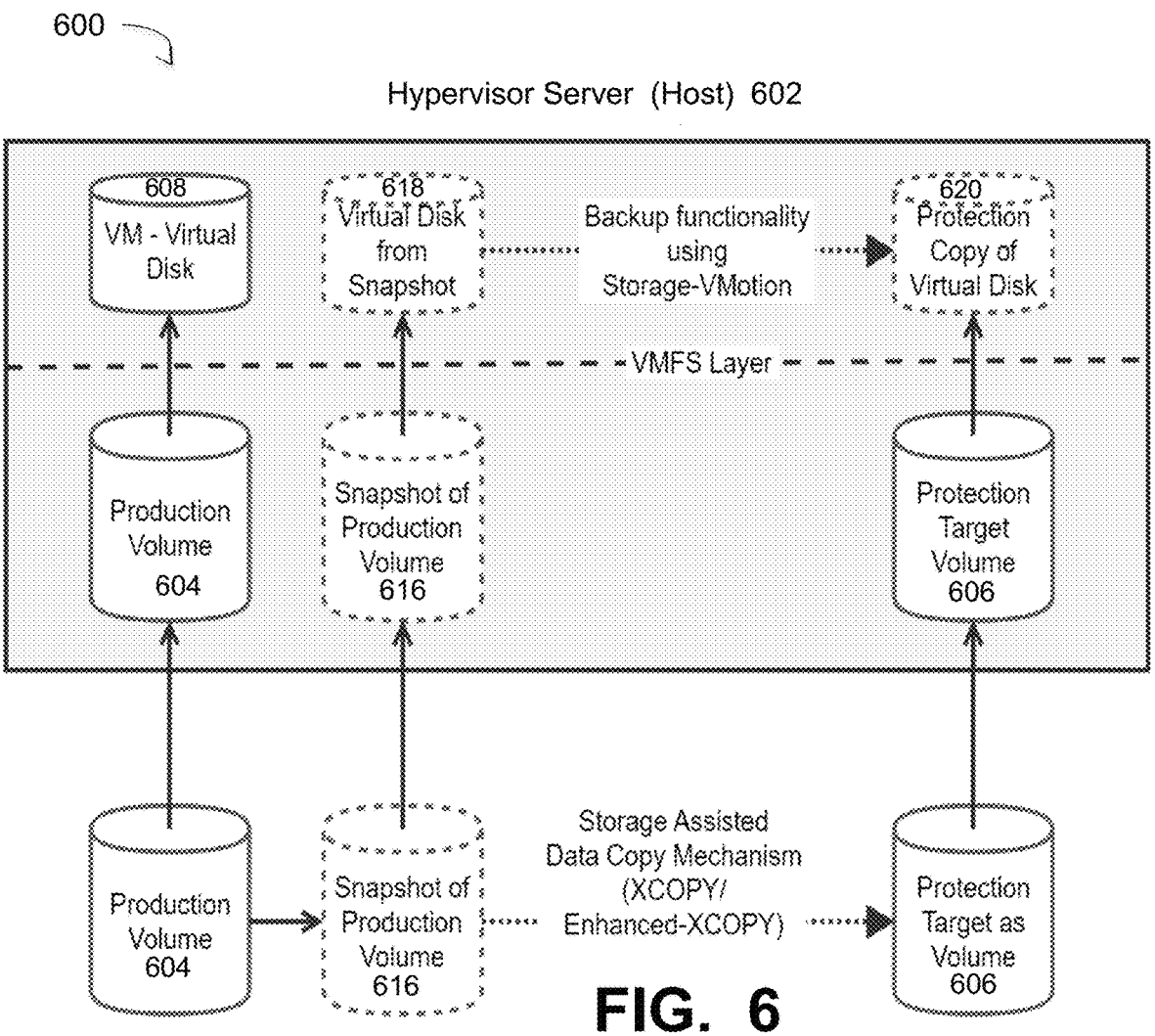
FIG. 6 is a diagram illustrating certain components for the process of FIG. 5, under some embodiments.

FIG. 6 is a diagram illustrating certain components for the process of FIG. 5, under some embodiments. As shown in diagram 600 of FIG. 6, a production volume 604 on primary storage is to send data to protection target 606 as secondary storage. The production volume 604 is exposed to the hypervisor host 602 and accesses VM 608 in the VMFS layer of the host. As described for FIG. 5, a snapshot of the production volume 616 is taken. This snapshot is also exposed to the host 602 and accesses a virtual disk from the snapshot 618.

The protection target is prepared as a volume 606 to receive the backup data from the production volume 604. In an embodiment, this is an empty volume that is exposed to the host 602 to create a protection copy of the virtual disk 620. The virtual disk from the snapshot 618 then sends data to the protection copy of the virtual disk 620 using the Storage-VMotion process. The snapshot of the production volume 616 is then effectively transferred to the protection target 606 using the XCOPY (if in the same storage array) or enhanced XCOPY (if disparate storage) technologies.

Figure 7:
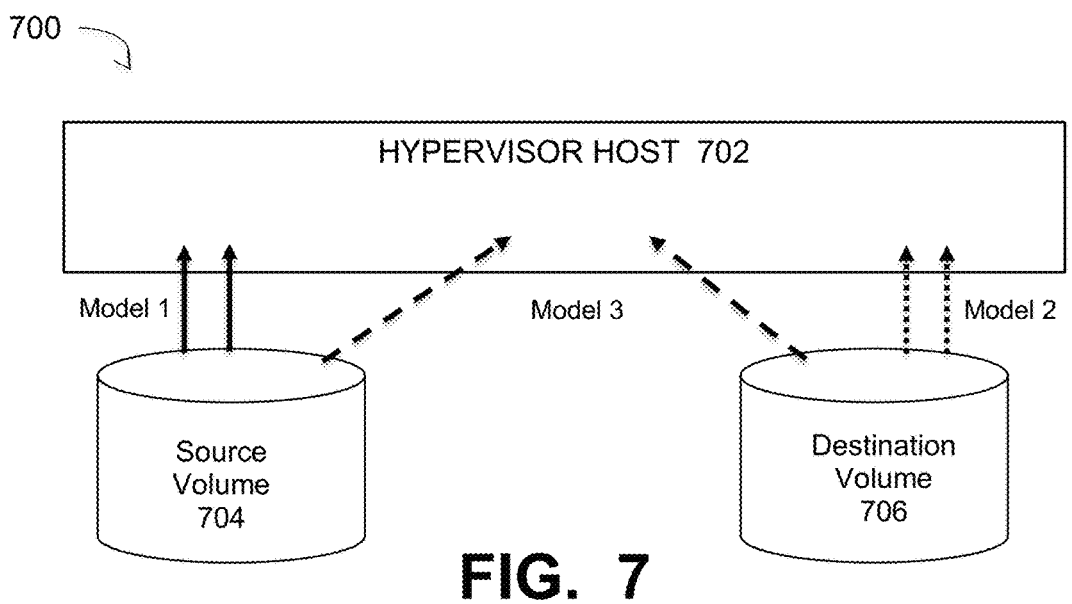
FIG. 7 illustrates three different models for mapping the source and destination to the hypervisor host, under some embodiments.

The system 600 can realized using three different models based on the method of exporting the storage snapshot and protection target to the hypervisor host 602. FIG. 7 illustrates three different models for exposing (mapping) the source and destination to the hypervisor host, under some embodiments. As shown in FIG. 7, system 700 comprises a source volume 704 sending data to the destination volume 706 using certain technologies implemented in the hypervisor host 702 by exposing the source and destination volumes to the hypervisor host. As shown in FIG. 7, the first model (model 1) involves exposing both the source and destination volumes from the source volume 704; the second model (model 2) involves exposing both the source and destination volumes from the destination volume 706, and the third model (model 3) involves exposing the source volume from the source volume 704 and the destination volume from the destination volume 706).

The first model, model 1, is one in which the protection target volume is exported via the production storage 704 to the host 702 and using XCOPY plus SV-Motion for the data copy operation, by leveraging the direct access feature of storage direct. In this method, both the source snapshot and the backup target are both exposed from production storage for the hypervisor host 702.

The second model, model 2, is one in which the protection (backup) target is exposed to the host directly via the backup device (Data Domain), and the snapshot of the production volume is also exported via DD (protection or backup) storage to the host 702, and then the SV-Motion process is used to do the data movement. In this method, both the source snapshot and the backup target are exported via the DD or protection (backup) 706 storage, for the hypervisor host 702.

The third model, model 3, is one in which the snapshot of the source volume is exported to the hypervisor host 702 via the production storage 704 and the protection (back-up) target is exported to the hypervisor host 702 directly from the protection (backup) target 706. In this method, for SV-Motion to offload the data-copy, SV-Motion makes use of the enhanced XCOPY described above since, in this case, the source and destination are across two different storage systems, i.e., one is production storage 704 and the other is a backup/protection target 706.

While exporting the protection target as a volume, for all of the models, the process 117 performs certain preliminary one-time steps to initialize a virtual Logical Unit (LU), e.g., one vLU per backup policy or Protection Life Cycle (PLC), and mount it as a VMFS datastore in the host. Such an initialization is required to ensure that the prepared backup target can be seen as a regular VMFS volume by hypervisor (ESXi) host.

In all of models 1-3, the granularity of VM level Backup shall be achieved by finding the intersection of changed blocks of the storage snapshot and XCOPY ranges of the virtual disk that is being backed up. The resultant set of blocks shall be copied between storage systems. Certain details of deducing the changed blocks per Virtual Disk (VDK) of VMs is provided with reference to FIG. 8, which illustrates storage assisted backup of VM data under model 1, under certain embodiments.

Figure 8:
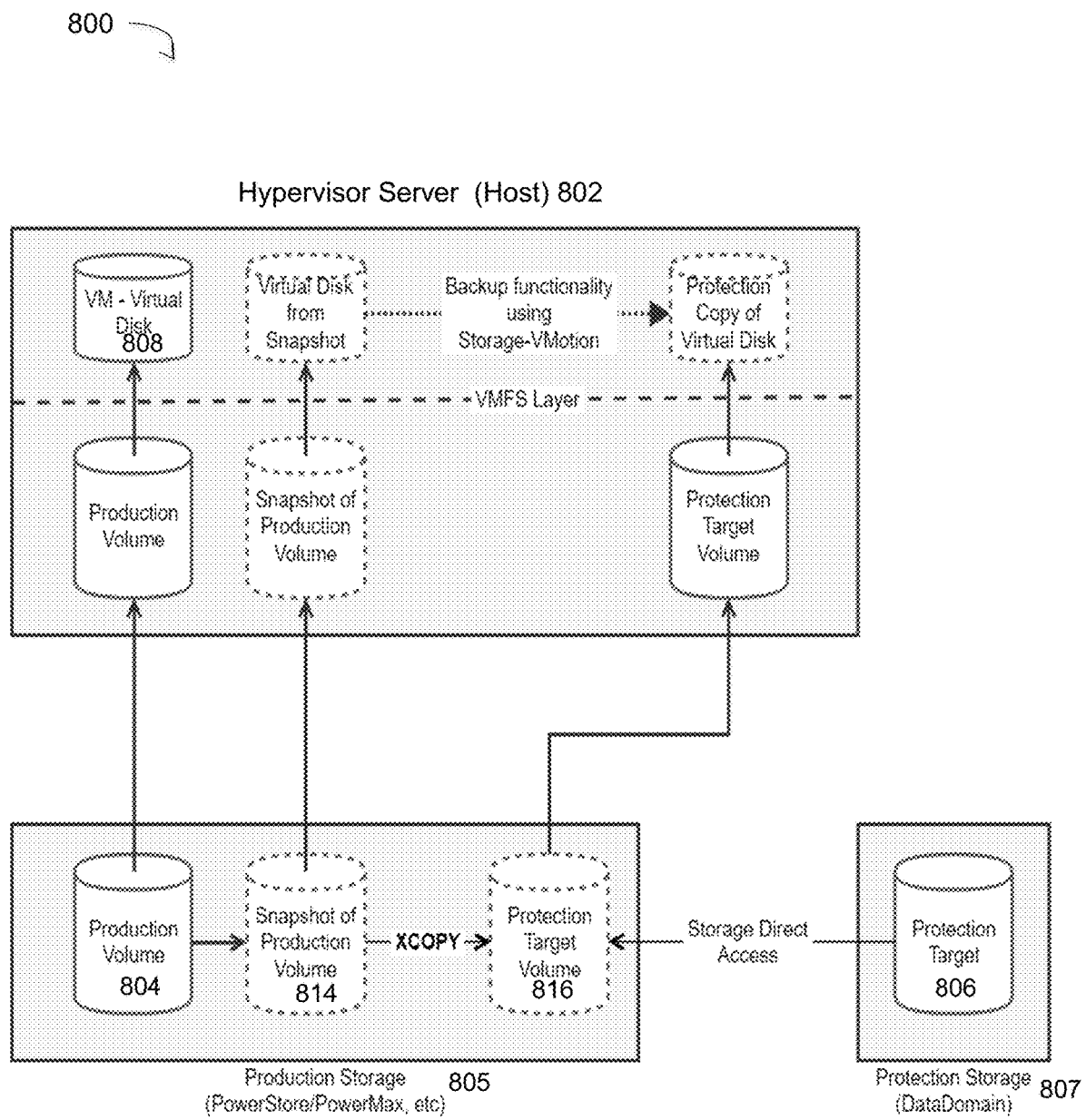
FIG. 8, which illustrates storage assisted backup of VM data under model 1, under certain embodiments.

Diagram 800 of FIG. 8 illustrates an implementation of the model 1 approach of exporting a protection target volume 804 via production storage 805 to the host 802 and using XCOPY plus SV-Motion for data copy operations. For this embodiment, the storage snapshot 814 from the source volume, which needs to be backed up, is made visible to the hypervisor host 802 as the source. The backup target 806, which is a Data Domain (or similar) entity 807, is also exported as a target volume to the host 802, but by leveraging the Storage Direct/Direct Access feature, via the production storage array 805. While exporting the protection target 806 as a volume, certain preliminary steps are required to initialize a virtual Logical Unit from the production storage 805 and mount it as a VMFS datastore in the host 802. The preliminary steps shall be optimized based on backup policies or protection life cycle. The SV-Motion operation is now done to move the data from the source 804 to the target volume 816. As a part of this process, XCOPY is used and SV-Motion will offload the data copy to the storage array 805. The storage array will copy the contents of the source snapshot 814 to the target Data Domain entity 807. The SV-Motion process of the VM 808 will attempt the copy data only for the ranges/blocks corresponding to the VM from within the source snapshot 814 and not copy the entire snapshot. This ensures that it can take a VM granular backup, for VMs which are VMFS based.

Figure 9:
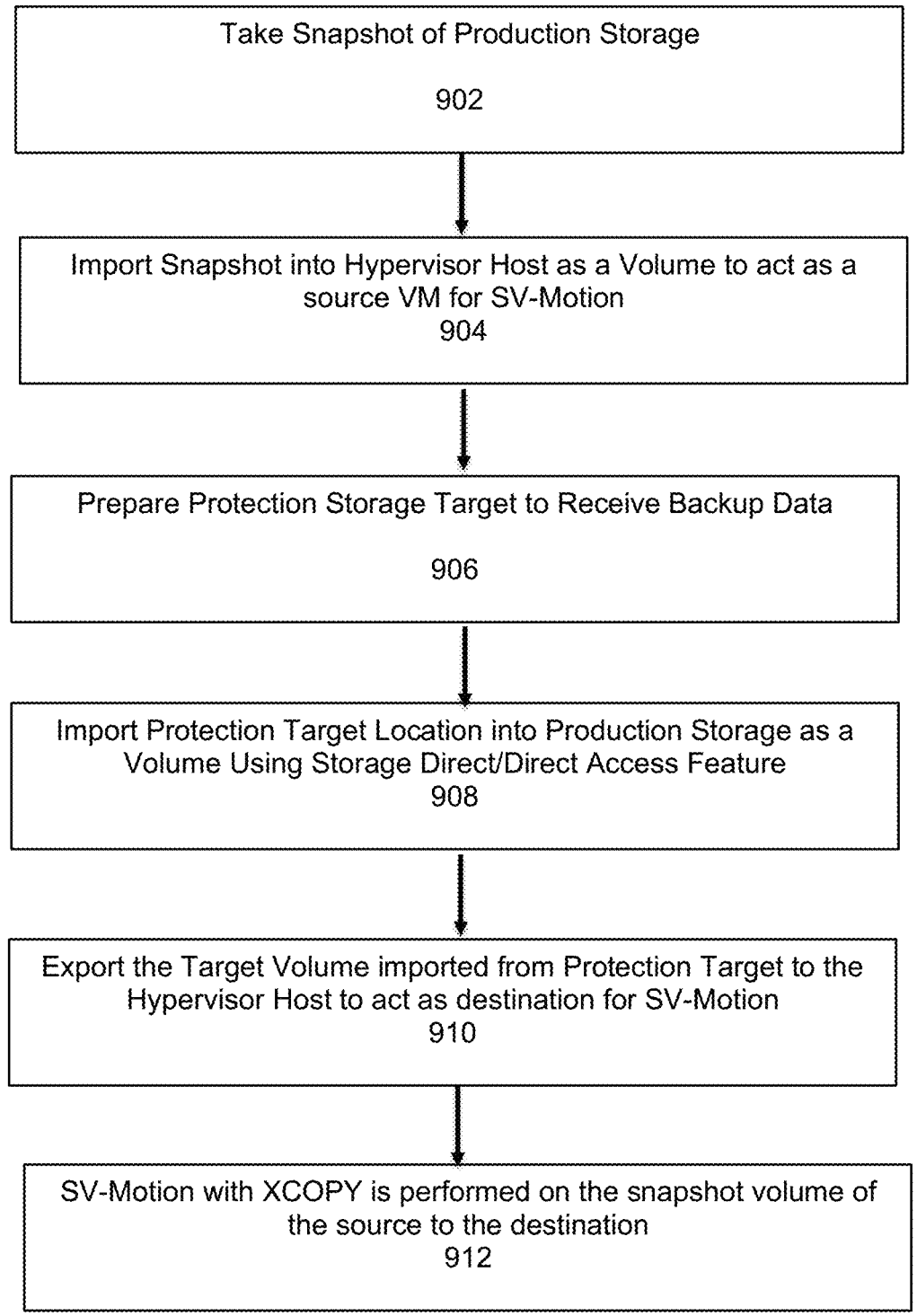
FIG. 9 is a flowchart that illustrates a backup operation using a storage assisted VM process, under some embodiments.

FIG. 9 is a flowchart that illustrates a backup operation using a storage assisted VM process, under some embodiments. As shown in FIG. 9, process 900 begins with taking a storage snapshot, 902. The snapshot is imported in to the hypervisor host as a volume to act as a source VM for the SV-Motion process, 904. The protection target is prepared using the target specific method, 906. The protection target location is then imported to the production storage as a volume using the Storage Direct/Direct Access feature, 908. Storage Direct allows the production storage to talk directly with the backup (protection) target, and the Direct Access feature allows the host to directly access a specific backup target, as if it is a regular volume.

Next, the target volume imported from the protection target using Storage Direct/Direct Access is exported to the hypervisor to acts as a destination for the SV-Motion process, 910. The SV-Motion process using XCOPY of the Virtual Disk(s) shall be performed from the snapshot volume (source) to the Storage Direct/Direct Access volume (destination). 912. Since both source and destination are like two volumes from the same storage system (Production storage systems), SV-Motion will offload the data copy with XCOPY, rather than Enhanced XCOPY.

Figure 10:
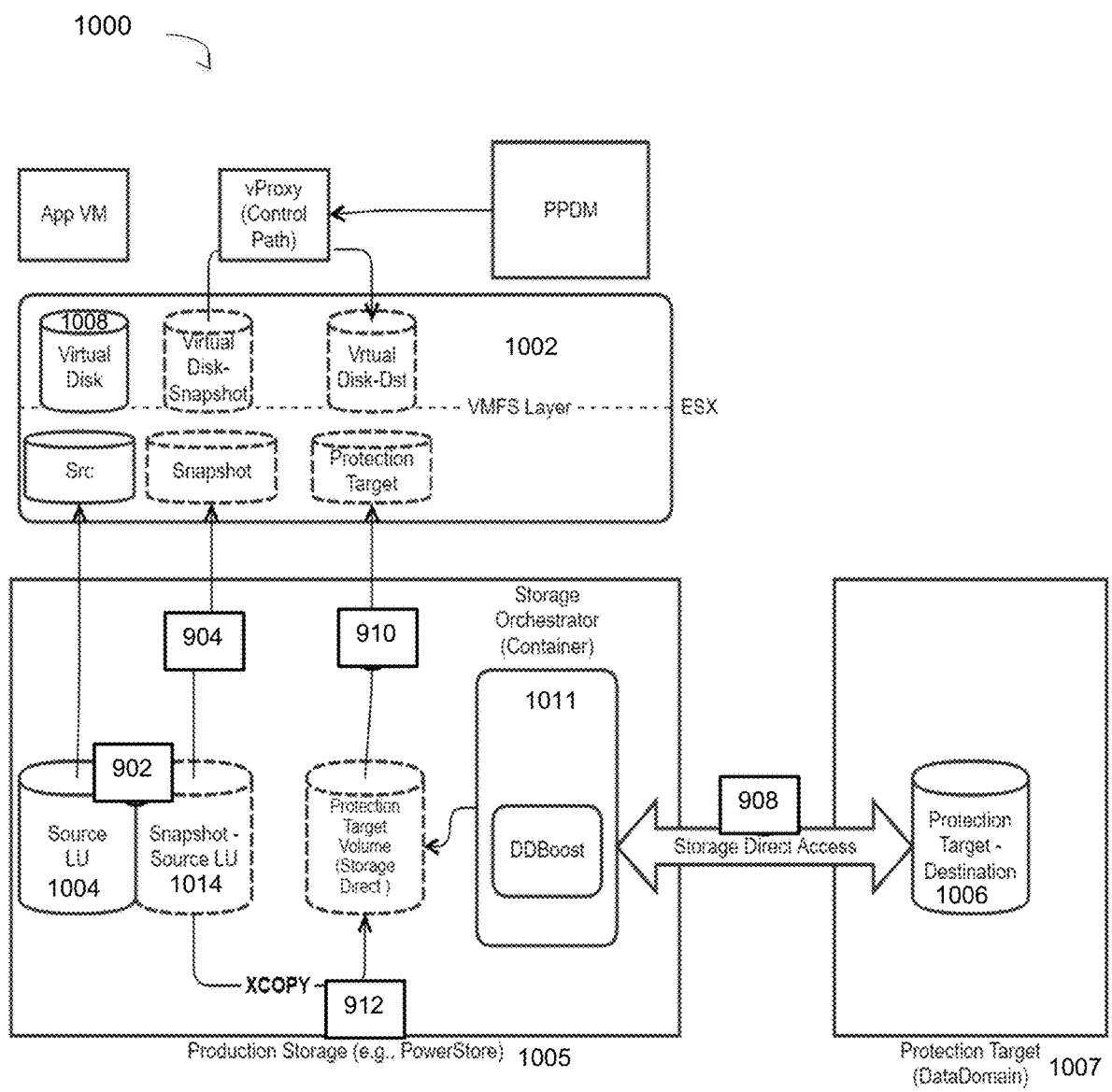
FIG. 10 is a block diagram that illustrates some of the functional steps of FIG. 9 performed on a system having source, destination, and hypervisor host, under some embodiments.

FIG. 10 is a block diagram that illustrates some of the functional steps of FIG. 9 performed on a system having source, destination, and hypervisor host, under some embodiments. System 1000 of FIG. 10 comprises a source LU 1004 in production storage 1004 storing data to protection target 1006 in a DataDomain system 1007 through a hypervisor host 1002. The processing steps 902 to 912 of FIG. 9 are shown with respect to the respective processing components of FIG. 10.

For the embodiment of FIG. 10, the production storage 1005 also includes a storage orchestrator component 1011. In an embodiment, this component processes certain change block tracking (CBT) operations utilized by incremental backups performed by system 1000. Incremental backups rely on CBT, and under some embodiments, the changed blocks of Virtual Disk 1008 for incremental backup are deduced by finding the intersection of changed blocks of storage LU and XCOPY ranges of Virtual Disk 1008 that is being backed up. The VM backup orchestrator 1011 shall deduce the resultant CBT and transfer only the changed data in the Virtual Disk.

For the XCOPY process, the range of blocks of entire Virtual Disk 1008 is sent to the production storage array 1005. The blocks of the Virtual Disk are translated to blocks in the LU in the VMFS layer. The storage orchestrator 1011 retrieves "changed blocks" for the entire snapshot. A snapshot differencing feature (snapdiff) of the production storage array can be used for this function. The intersection of these two are the blocks that are required to be updated in the backup entity of Data Domain, 1007.

As is known, a regular periodic backup operation comprises taking a full backup of the system followed by regular incremental backups, such as one full backup every quarter each followed by weekly (or daily) incremental backups. For a full backup, the entire range of blocks received as part of the XCOPY process shall be backed up. The blocks received as part of XCOPY represents the entire Virtual Disk 1008 regions.

For an incremental backup, the process finds the overlap of "Changed Blocks (Storage LU)" and XCOPY block ranges (Virtual Disk), to get the changed blocks of the Virtual Disk.

Figure 11:
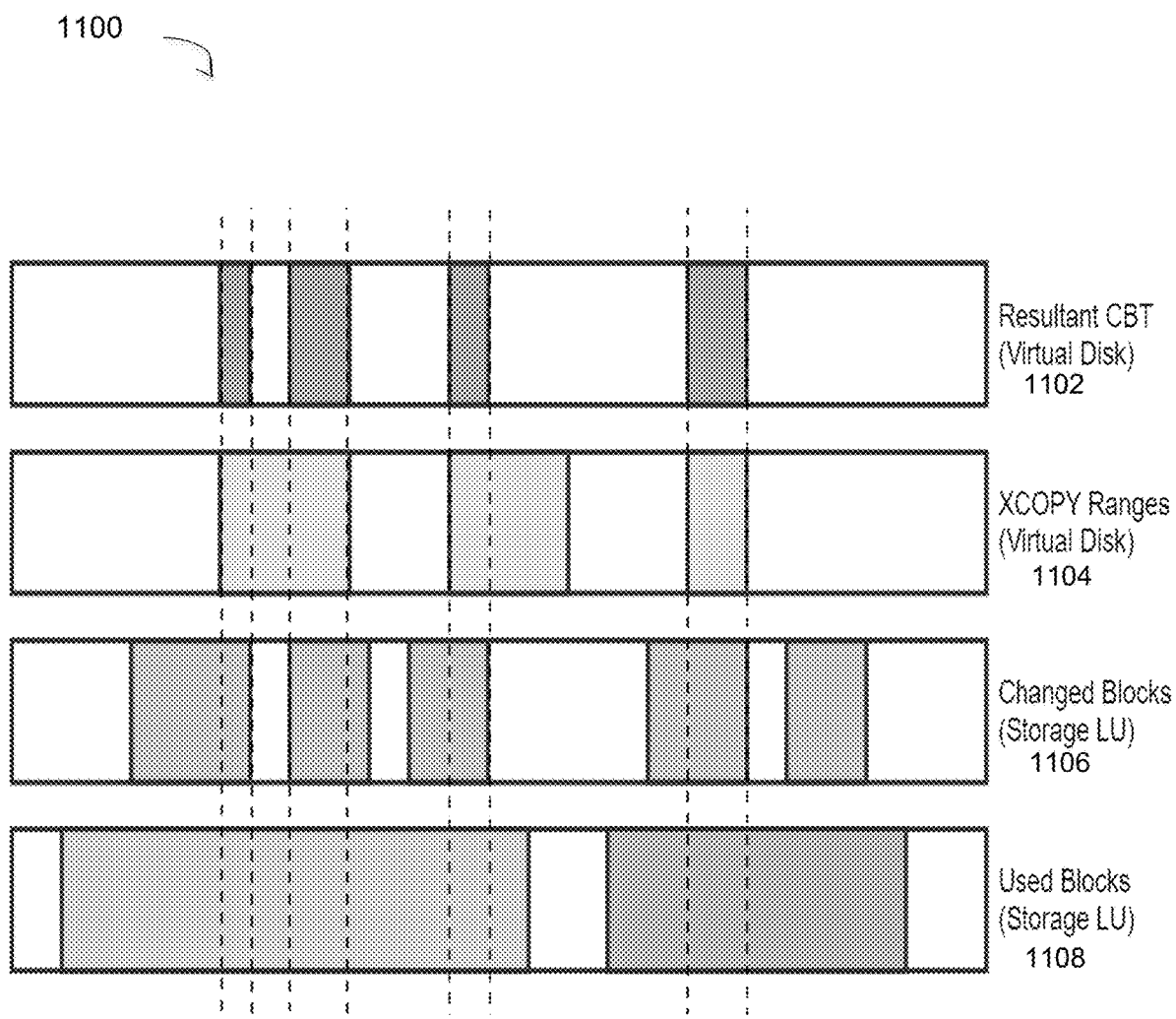
FIG. 11 illustrates some example backup operations for different blocks and ranges, under some embodiments.

FIG. 11 illustrates some example backup operations for different blocks and ranges, under some embodiments. Diagram 1100 of FIG. 11 illustrates some example blocks 1102 for the resultant CBT for the Virtual Disk 1008. The example XCOPY ranges for the virtual disk are shown as element 1104. The changed blocks in the storage LU are shown as element 1106, and the used blocks for the storage LU are shown as 1108.

In FIG. 11, the used blocks for the storage LU 1108 represents the storage blocks occupied by Virtual Disks of the VM being backed up as well as Virtual Disks of other VMs and any other data. The changed blocks in the storage LU 1106 represent the only the blocks that are changed between a previous snapshot and a current snapshot using snapshot differencing feature (like snapdiff) in production storage. The changed block 1106 contains changed blocks in the Virtual Disks of the VM being backed up as well as changed blocks all other Virtual Disks and data in the Storage LU.

The XCOPY ranges for the virtual disk being backed up 1104 represents the entire range of blocks of the Virtual Disks of VM being backed up. When it receives a Storage Vmotion request of Virtual Disks of the VM being backed up from the source volume to the destination volume, the VMFS layer in the hypervisor host prepares the XCOPY command with the entire set of blocks of the Virtual Disks ranges and submits it to the storage. The resultant Changed Blocks for the Virtual Disk per VM 1102 represents the intersection of storage blocks between the changed blocks in the storage LU 1106 and the XCOPY range of blocks for the Virtual Disk being backed up 1104. This set of changed blocks for the Virtual Disk is then transferred to secondary storage, which provides an incremental backup feature at the VM level using the Storage-Direct feature. This process of deducing changed blocks for the Virtual disk per VM in the storage layer facilitates the storage assisted VM backup process 117.

Figure 12:
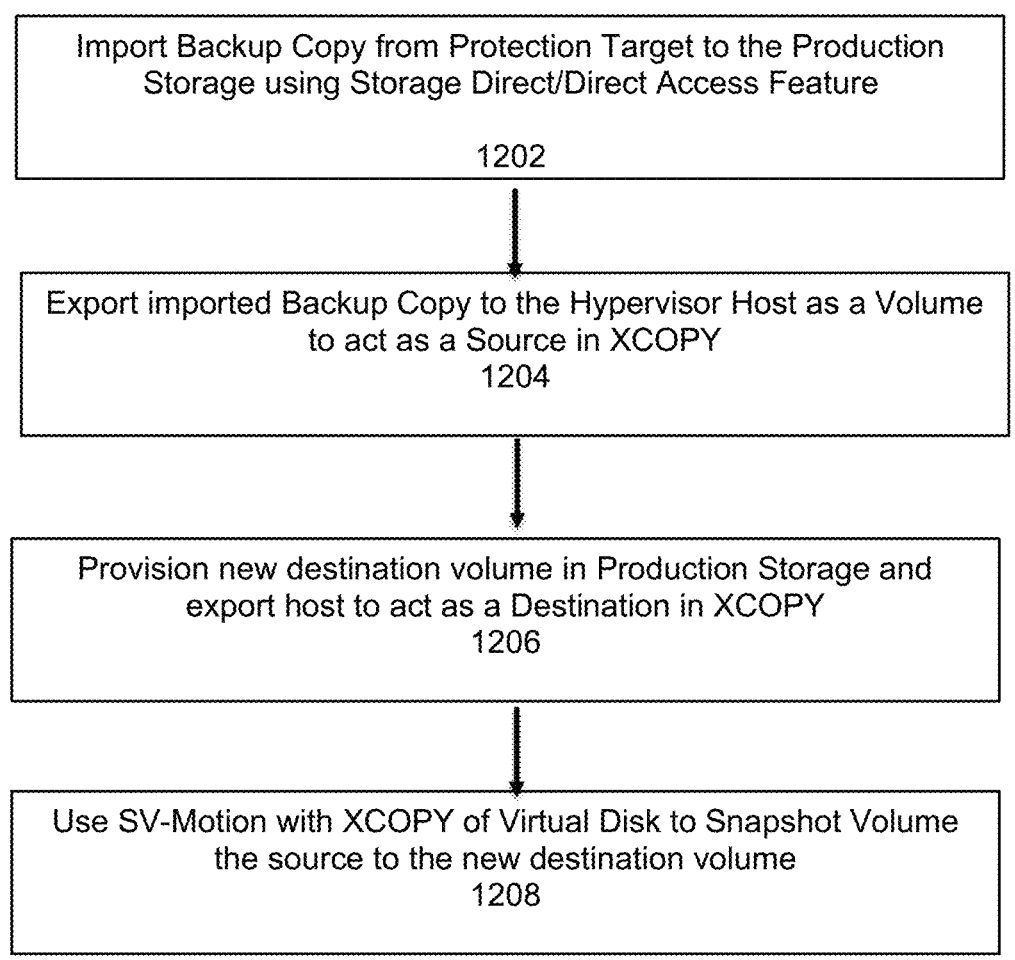
FIG. 12 is a flowchart that illustrates a method of recovering a new VM image, under some embodiments.

Embodiments have been described with respect to a backup operation from a source volume to a destination volume. Data protection systems are also required to reliably perform data recovery operations saved on protection storage back to the production environment in a disaster recovery process. FIG. 12 is a flowchart that illustrates a method of recovering a new VM image, under some embodiments. For process 1200, the backup copy from the protection target (DataDomain) is imported to the production storage as a volume using the Storage Direct/Direct Access feature, 1202. The backup copy imported from the protection target using Storage Direct/Direct Access is then exported to the hypervisor host as a volume, 1204. This acts as a source in XCOPY. The new destination volume is provisioned in the production storage and is exported to host to act as a destination in XCOPY, 1206. The process then performs SV-Motion using XCOPY of the Virtual Disk(s) from the Storage Direct/Direct Access volume (source) to snapshot the source volume to the new destination volume.

Figure 13:
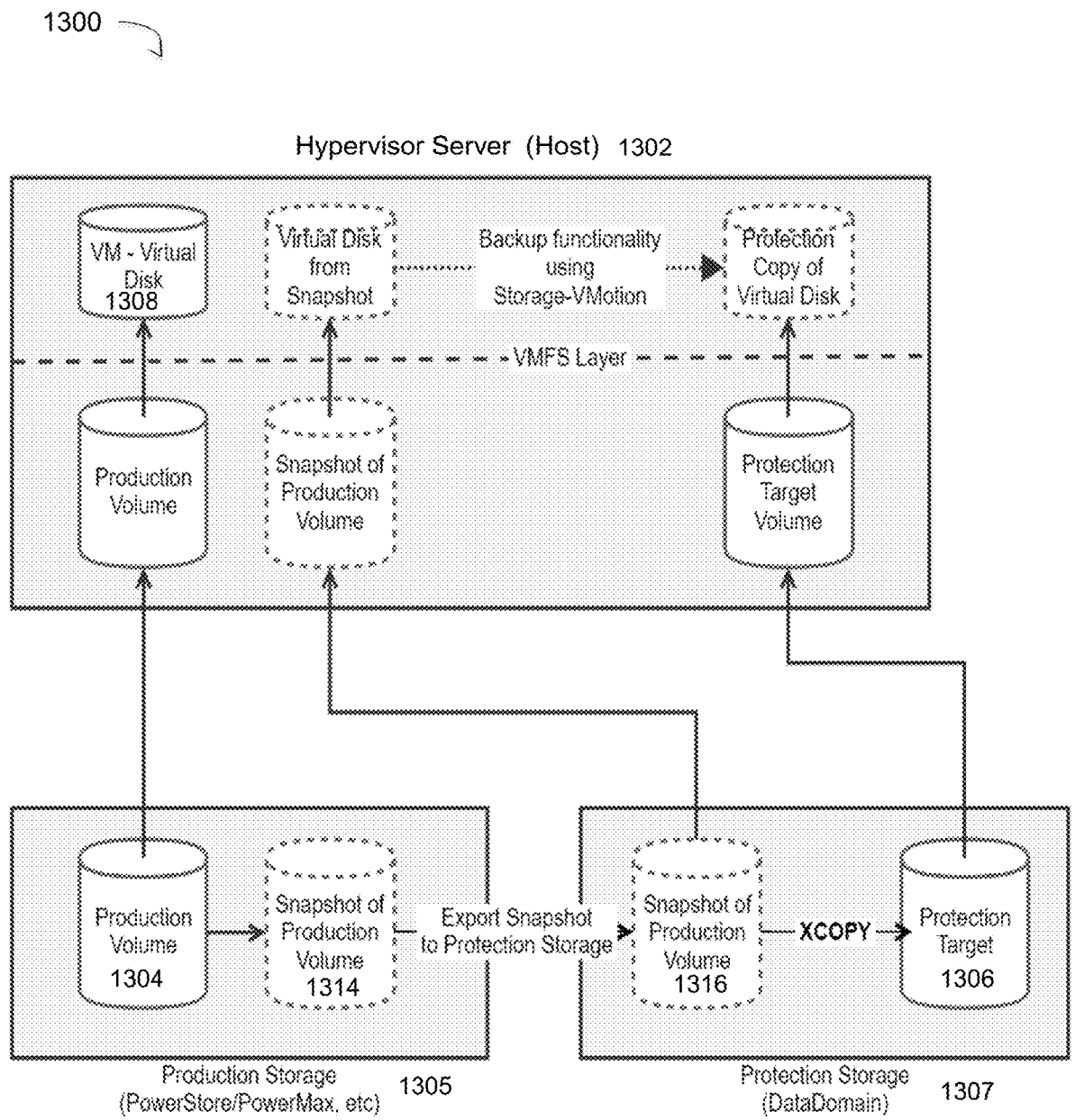
FIG. 13 illustrates storage assisted backup of VM data under model 2, under certain embodiments.

As shown in FIG. 7, there are three models for exposing the source 704 and destination 706 to the hypervisor host 702. As described above, FIG. 8 illustrated an embodiment for model 1 of diagram 700. FIG. 13 illustrates the model 2 system of exporting a snapshot of the production volume via protection storage to the host and using SVMotion to perform the backup. Under this model 1300, the snapshot of source volume 1314, which needs to be backed up is exported to the host 1302 via protection storage 1307 (e.g., for DataDomain). The protection target 1306, which is a DataDomain entity, shall also be exported to the host 1302 as a volume. While exporting the protection target as volume, certain preliminary steps are required to initialize a virtual Logical Unit from protection storage 1307 (DataDomain) and mount it as a VMFS datastore, in the host 1302. This will ensure that the host is able to recognize the protection target 1306 as a regular VMFS datastore. The preliminary steps shall be optimized based on backup policies or protection life cycle. The SV-Motion operation shall be done to move the data from the source 1304 to the target volume 1306, at the VM granularity. As a part of this SV-Motion, XCOPY shall be used as a data copy offload mechanism to protection storage 1307. The protection system will then pull the data from source snapshot 1314 to the target DataDomain entity. This is achieved using the Storage Direct feature, which allows direct access between production 1305 and protection storage systems 1307. SV-Motion of the VM 1308 will attempt the copy only for the ranges/blocks corresponding to the VM from within the source snapshot 1314 and not copy the entire snapshot. This ensures that we can take a VM granular backup for VMs which are VMFS based.

Figure 14:
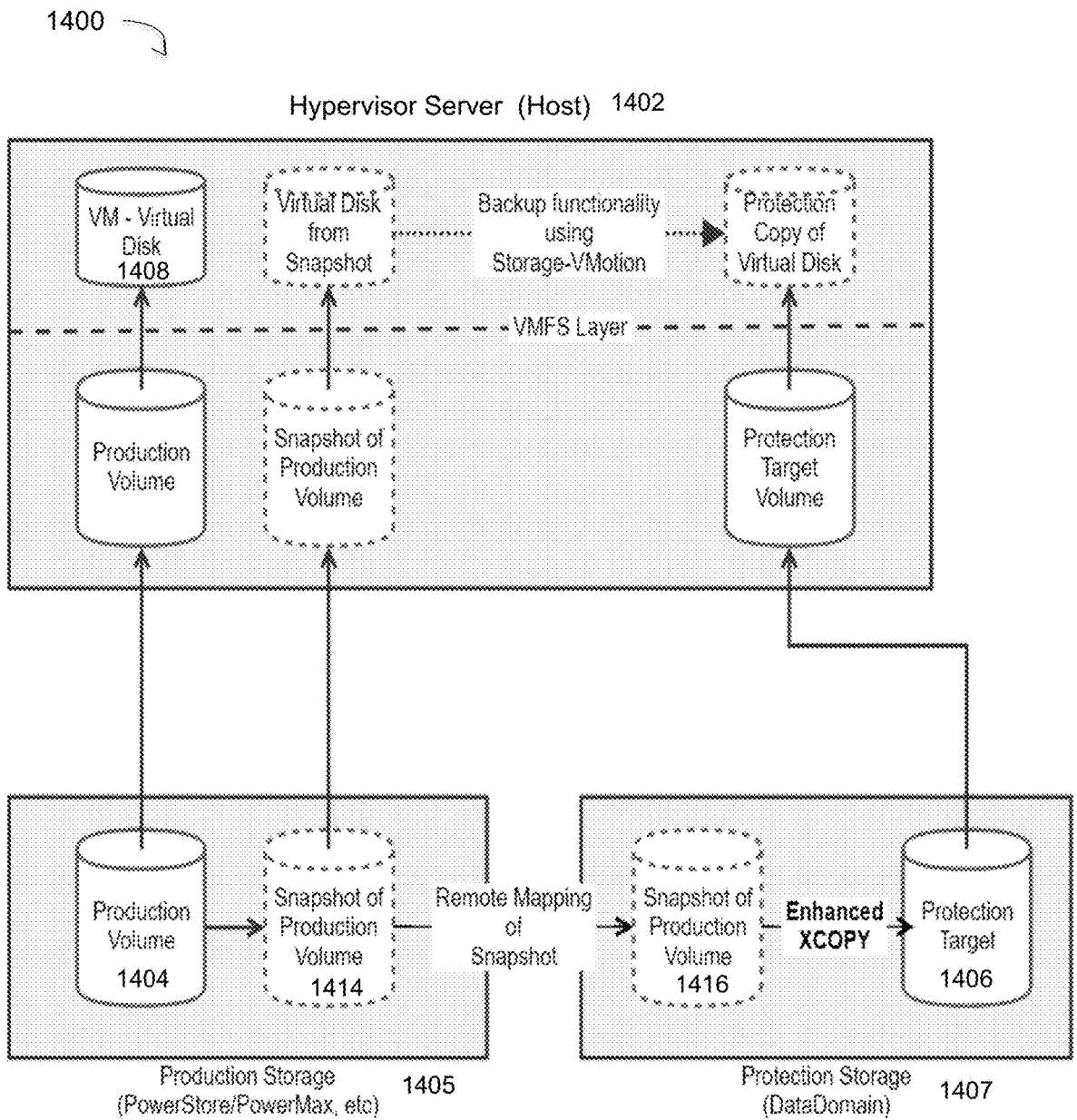
FIG. 14 illustrates storage assisted backup of VM data under model 3, under certain embodiments.

FIG. 14 below illustrates the Model 3 system of exporting a snapshot of the source volume via production storage and exporting the backup (protection) target from the protection storage system and using SVMotion to do the backup. In this model 1400, the snapshot of the source volume 1414, which needs to be backed up is exported to the host 1402 via production storage 1405. In addition to that, the snapshot of source volume is also remotely mapped 1416 in protection storage 1407. This is possible with the Storage Direct feature, which allows direct access between production 1405 and protection 1407 storage systems. The protection target 1406, which is a DataDomain entity, shall also exported to host as volume via the protection (backup) storage system 1407. While exporting the protection target 1406 as volume, certain preliminary steps are performed to initialize a virtual Logical Unit from protection storage (DataDomain) and mount it as a VMFS datastore, in the host 1402. The preliminary steps are optimized based on backup policies or protection life cycle. The SV-Motion operation shall be done to move the data from the source 1404 to the target 1406 volume. In this case, an Enhanced-XCOPY operation shall be used as a data copy offload mechanism to storage system (Protection Storage) 1407, since the source and destination volumes are from different storage systems. The protection system will then pull the data from the source snapshot 1414 to the target DataDomain entity by using the Storage Direct feature between the production and protection storage systems. The SV-Motion process of the VM 1408 will attempt the copy only for the ranges/blocks corresponding to the VM from within the source snapshot and not copy the entire snapshot. This ensures that we can take a VM granular backup, for VMs which are VMFS based.

Under all of the models, embodiments provide a unique, innovative and a scalable backup solution for VMFS based VMs. This method will perform backups for VMFS based VMs without overloading the production host and making use of production storage array. It is also very efficient since it directly copies data from production storage array and the backup (protection) target, without any additional hops. The solution will be both scalable and have better performance, in addition of saving production host costs.

Embodiments may be implemented using a computer system used to execute one or more software components of a system for backing up data, and which may include components such as a monitor, keyboard, and mass storage devices. Computer system further includes subsystems such as central processor, system memory, input/output (I/O) controller, display adapter, serial or universal serial bus (USB) port, network interface, and speaker . The system may also be used with computer systems with additional or fewer subsystems. For example, a computer system could include more than one processor (i.e., a multiprocessor system) or a system may include a cache memory.

Figure 15:
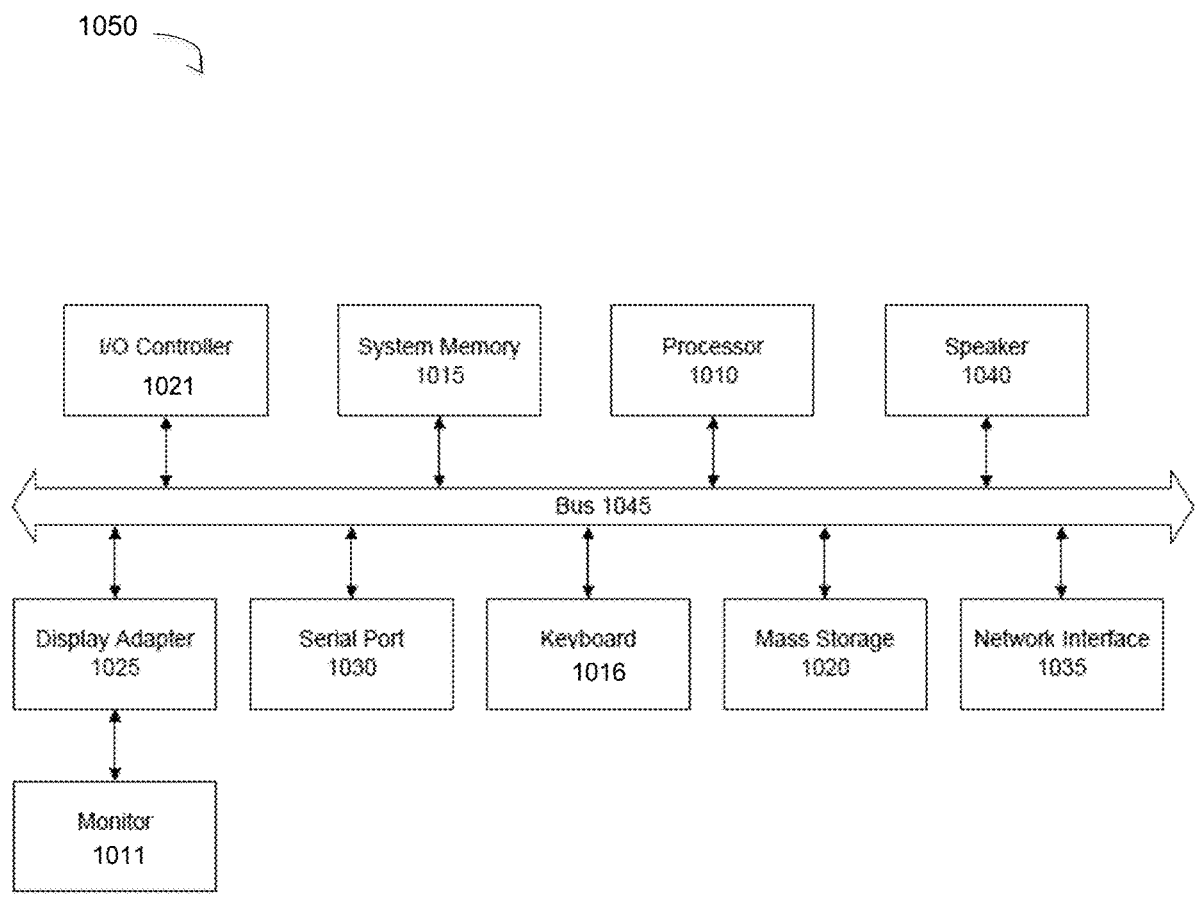
FIG. 15 is a system block diagram of a computer system used to execute one or more software components of a system for implementing a storage assisted VM backup process, under some embodiments.

FIG. 15 is a system block diagram of a computer system used to execute one or more software components of a system for implementing a storage assisted VM backup process, under some embodiments. The example computer system 1050 includes a monitor 1011, keyboard 1017, and mass storage devices 1020. Computer system 1000 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1050 is just one example of a computer system suitable for use with the present system. Other configurations of subsystems suitable for use with the described embodiments will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Although certain embodiments have been described and illustrated with respect to certain example network topographies and node names and configurations, it should be understood that embodiments are not so limited, and any practical network topography is possible, and node names and configurations may be used. Likewise, certain specific programming syntax and data structures are provided herein. Such examples are intended to be for illustration only and embodiments are not so limited. Any appropriate alternative language or programming convention may be used by those of ordinary skill in the art to achieve the functionality described.

For the sake of clarity, the processes and methods herein have been illustrated with a specific flow, but it should be understood that other sequences may be possible and that some may be performed in parallel. Additionally, steps may be subdivided or combined. As disclosed herein, software written in accordance with embodiments may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of transferring data directly from primary storage to secondary storage in a virtualized network including virtual machine (VM) based storage, comprising:
    exposing a source volume in the primary storage and exporting it to a hypervisor host of the virtualized network so that the host can see the source volume;
    preparing a destination volume of the secondary storage as an empty volume and exporting it to the hypervisor host so that the host can see the destination volume; and
    moving, in the hypervisor host data from the exposed source volume to the exported empty destination volume using a combination of Storage Direct, Storage VMotion, and XCOPY technology, and wherein the XCOPY technology provides a direct transfer of data from the primary storage to the secondary storage.

2. The method of claim 1 wherein the primary storage is production storage and the secondary storage is protection storage for storing data of the source volume backed by a deduplicated backup process.

3. The method of claim 2 wherein the deduplicated backup process utilizes change block tracking (CBT), the method further comprising:
    taking a full backup of the system followed by one or more regular incremental backups;

receiving, for the full backup, an entire range of blocks by the secondary storage as part of an XCOPY operation, the entire range representing an entire Virtual Disk region; and finding, for the incremental backup, an overlap of changed blocks of storage logical units (LU) and XCOPY block ranges to get the changed blocks of the Virtual Disk.

4. The method of claim 3 further comprising mapping the source volume and the destination volume one of both within the primary storage, or both within the secondary storage.

5. The method of claim 3 further comprising mapping the source volume from within the primary storage and the destination volume from within the secondary storage.

6. The method of claim 1 wherein the Storage Direct technology represents a process that allows a host to directly access a backed-up volume without performing a restore operation.

7. The method of claim 1 wherein the Storage VMotion represents a process providing seamless migration across storage systems without imposing any down-time or requiring application reconfiguration by utilizing a storage system-based data copy offload mechanism.

8. The method of claim 7 wherein the data copy offload mechanism comprises XCOPY as a standard SCSI (small computer system interface) command wherein the copy operation is offloaded to the array software by providing an offset and range a storage array for performing the direct data transfer between a source and destination within the same storage array.

9. The method of claim 7 wherein the data copy offload mechanism of the XCOPY technology comprises an Enhanced XCOPY primitive that allows the copy operation to be offloaded between the source and destination in different storage arrays.

10. A computer-implemented method of transferring data directly from a production volume to a protection volume, comprising:
    taking a snapshot copy of the production volume;
    preparing the protection volume to receive backup data from the production volume;
    exposing, through first a mapping, the production volume snapshot copy and prepared protection volume, through a second mapping, to a hypervisor host as if they are two regular virtual machine file system (VMFS) volumes; and
    performing the backup operation for the VMFS based virtual machines by offloading the data copy operation to the storage system of at least one of the production volume or protection volume to enable a direct transfer of data without involving the hypervisor host.

11. The method of claim 10 wherein each of the first mapping and second mapping is performed from within one of: a production storage array storing the production volume, or a protection storage array storing the protection volume.

12. The method of claim 10 wherein the backup operation utilizes change block tracking (CBT), the method further comprising:
    taking a full backup of the production volume followed by one or more regular incremental backups; receiving, for the full backup, an entire range of blocks by the protection storage as part of an XCOPY operation, the entire range representing an entire Virtual Disk region; and
    finding, for the incremental backup, an overlap of changed blocks of storage logical units (LU) and XCOPY block ranges to get the changed blocks of the Virtual Disk.

13. The method of claim 10 wherein the first mapping is performed from within a production storage array storing the production volume, and the second mapping is performed from within a protection storage array storing the protection volume.

14. The method of claim 10 wherein the second mapping is performed using a Storage Direct process that allows a host to directly access a backed-up volume without performing a restore operation.

15. The method of claim 10 wherein the step of performing the backup operation further comprises invoke a Storage VMotion process for the VMFS based VMs by offloading the data copy operation to the production or protection storage systems to enable direct transfer of data without involving the hypervisor host.

16. The method of claim 15 wherein the data copy offload mechanism comprises XCOPY as a standard SCSI (small computer system interface) command wherein the copy operation is offloaded to the array software by providing an offset and range a storage array for performing the direct data transfer between a source and destination within the same storage array.

17. The method of claim 16 wherein the data copy offload mechanism comprises an Enhanced XCOPY primitive that allows the copy operation to be offloaded between the source and destination in different storage arrays.

18. The method of claim 10 further comprising performing a restore of the protection volume back to the production volume, by:
    importing the backup copy from the protection target to the production storage as a volume using a Storage Direct/Direct Access feature.
    exporting the imported backup copy to the hypervisor host as a volume, to act as a source in XCOPY;
    provisioning a new destination volume is in production storage;
    exporting the provisioned volume to the host to act as a destination in XCOPY; and
    performing an SV-Motion-process using XCOPY of Virtual Disk(s) from the Storage Direct/Direct Access volume to snapshot the source volume to the new destination volume.

19. A system for transferring data directly from primary storage to secondary storage in a virtualized network including virtual machine (VM) based storage, comprising:
    a storage assisted virtual machine backup component exposing a source volume in the primary storage to a hypervisor host of the virtualized network so that the host an see the source volume, and preparing a destination volume of the secondary storage as an empty volume and exporting it to the hypervisor host so that the host can see the destination volume; and
    an interface component moving, in the hypervisor host data from the exposed source volume to the exported empty destination volume using a combination of Storage Direct, Storage VMotion, and XCOPY or enhanced XCOPY technologies, and wherein the XCOPY technology provides a direct transfer of data from the primary storage to the secondary storage when both are in the same storage array, and the enhanced XCOPY technology provides a direct transfer of data from the primary storage to the secondary storage when both are in different storage arrays.

20. The system of claim 19 wherein the primary storage is production storage and the secondary storage is protection storage for storing data of the source volume backed by a deduplicated backup process.

* * * * *